(12) United States Patent
Pelland et al.

(10) Patent No.: US 9,000,930 B2
(45) Date of Patent: Apr. 7, 2015

(54) HAND HYGIENE COMPLIANCE SYSTEM

(75) Inventors: Michael J. Pelland, Princeton, WI (US);
Morgan J. Lowery, DeForest, WI (US);
Richard S. Walters, Hugo, MN (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 248 days.

(21) Appl. No.: 13/114,216

(22) Filed: May 24, 2011

(65) Prior Publication Data

US 2011/0291840 A1    Dec. 1, 2011

Related U.S. Application Data

(60) Provisional application No. 61/347,715, filed on May 24, 2010.

(51) Int. Cl.
| G08B 23/00 | (2006.01) |
| G08B 21/22 | (2006.01) |
| G01S 5/02 | (2010.01) |
| G08B 21/24 | (2006.01) |

(52) U.S. Cl.
CPC . *G08B 21/22* (2013.01); *G01S 5/02* (2013.01); *G08B 21/24* (2013.01)

(58) Field of Classification Search
CPC ........... G08B 21/22; G08B 21/24; G01S 5/02
USPC ................ 340/573.1, 573.4, 539.12; 600/300
See application file for complete search history.

(56) References Cited

U.S. PATENT DOCUMENTS

| 3,967,478 A | 7/1976 | Guinn |
| 4,275,385 A | 6/1981 | White |
| 4,601,064 A | 7/1986 | Shipley |
| 4,606,085 A | 8/1986 | Davies |
| 4,814,751 A | 3/1989 | Hawkins et al. |

(Continued)

FOREIGN PATENT DOCUMENTS

| EP | 0758702 A1 | 2/1997 |
| EP | 0921506 A1 | 6/1999 |

(Continued)

OTHER PUBLICATIONS

J.M. Broughall, et al, "An Automatic Monitoring Systems for Measuring Handwashing Frequency in Hospital Wards", Journal of Hospital Infection, 1984, pp. 447-453, vol. 5, The Hospital Infection Society, 1984.

(Continued)

*Primary Examiner* — Thomas Mullen
(74) *Attorney, Agent, or Firm* — Alston & Bird LLP

(57) ABSTRACT

A system and method for performing hand hygiene compliance. The method includes receiving a notification that an individual has entered a physical location. The notification is received by a node in a wireless mesh network that includes a plurality of nodes corresponding to objects in the physical location. A hand hygiene protocol is identified for the individual. It is determined that the individual has not followed the hand hygiene protocol. The determining is performed by software executing on the nodes in the wireless mesh network and responsive to a previous and a current location of the individual relative to the objects in the physical location. The individual is notified in response to determining that the individual has not followed the hand hygiene protocol.

21 Claims, 15 Drawing Sheets

(56) References Cited

U.S. PATENT DOCUMENTS

| | | |
|---|---|---|
| 4,896,144 A | 1/1990 | Bogstad |
| 4,990,892 A | 2/1991 | Guest et al. |
| 5,119,104 A | 6/1992 | Heller |
| 5,199,118 A | 4/1993 | Cole et al. |
| 5,202,666 A | 4/1993 | Knippscheer |
| 5,204,670 A | 4/1993 | Stinton |
| 5,291,399 A | 3/1994 | Chaco |
| 5,387,993 A | 2/1995 | Heller et al. |
| RE35,035 E | 9/1995 | Shipley |
| 5,455,851 A | 10/1995 | Chaco et al. |
| 5,465,082 A | 11/1995 | Chaco |
| 5,515,426 A | 5/1996 | Yacenda et al. |
| 5,548,637 A | 8/1996 | Heller et al. |
| 5,572,195 A | 11/1996 | Heller et al. |
| 5,594,786 A | 1/1997 | Chaco et al. |
| 5,610,589 A | 3/1997 | Evans et al. |
| 5,629,678 A | 5/1997 | Gargano et al. |
| 5,633,742 A | 5/1997 | Shipley |
| 5,661,459 A | 8/1997 | Belcher |
| 5,670,945 A | 9/1997 | Applonie |
| 5,689,229 A | 11/1997 | Chaco et al. |
| 5,695,091 A | 12/1997 | Winings |
| 5,699,038 A | 12/1997 | Ulrich et al. |
| 5,745,039 A | 4/1998 | Hof et al. |
| 5,745,272 A | 4/1998 | Shipley |
| 5,771,925 A | 6/1998 | Lewandowski |
| 5,793,653 A | 8/1998 | Segal |
| 5,808,553 A | 9/1998 | Cunningham |
| 5,812,059 A | 9/1998 | Shaw et al. |
| 5,818,617 A | 10/1998 | Shipley |
| 5,822,418 A | 10/1998 | Yacenda et al. |
| 5,822,544 A | 10/1998 | Chaco et al. |
| 5,838,223 A | 11/1998 | Gallant et al. |
| 5,870,015 A | 2/1999 | Hinkel |
| 5,900,067 A | 5/1999 | Jones |
| 5,900,801 A | 5/1999 | Heagle et al. |
| 5,917,425 A | 6/1999 | Crimmins |
| 5,939,974 A | 8/1999 | Heagle et al. |
| 5,945,910 A | 8/1999 | Gorra |
| 5,952,924 A | 9/1999 | Evans et al. |
| 5,954,069 A | 9/1999 | Foster |
| 5,960,991 A | 10/1999 | Ophardt |
| 5,966,753 A | 10/1999 | Gauthier et al. |
| 6,029,600 A | 2/2000 | Davis |
| 6,031,461 A | 2/2000 | Lynn |
| 6,038,331 A | 3/2000 | Johnson |
| 6,104,295 A | 8/2000 | Gaisser et al. |
| 6,125,482 A | 10/2000 | Foster |
| 6,147,607 A | 11/2000 | Lynn |
| 6,154,139 A | 11/2000 | Heller |
| 6,169,484 B1 | 1/2001 | Schuchman et al. |
| 6,206,238 B1 | 3/2001 | Ophardt |
| 6,211,788 B1 | 4/2001 | Lynn et al. |
| 6,236,317 B1 | 5/2001 | Cohen et al. |
| 6,236,953 B1 | 5/2001 | Segal |
| 6,278,372 B1 | 8/2001 | Velasco, Jr. et al. |
| 6,344,794 B1 | 2/2002 | Ulrich et al. |
| 6,375,038 B1 | 4/2002 | Daansen et al. |
| 6,392,546 B1 | 5/2002 | Smith |
| 6,404,837 B1 | 6/2002 | Thompson et al. |
| 6,426,701 B1 | 7/2002 | Levy et al. |
| 6,433,689 B1 | 8/2002 | Hovind et al. |
| 6,462,656 B2 | 10/2002 | Ulrich et al. |
| 6,523,193 B2 | 2/2003 | Saraya |
| 6,536,060 B1 | 3/2003 | Janssens et al. |
| 6,539,393 B1 | 3/2003 | Kabala |
| 6,542,568 B1 | 4/2003 | Howes, Jr. et al. |
| 6,577,240 B2 | 6/2003 | Armstrong |
| 6,707,873 B2 | 3/2004 | Thompson et al. |
| 6,727,818 B1 | 4/2004 | Wildman et al. |
| 6,825,763 B2 | 11/2004 | Ulrich et al. |
| 6,832,916 B2 | 12/2004 | Collopy |
| 6,838,992 B2 | 1/2005 | Tenarvitz |
| 6,882,278 B2 | 4/2005 | Winings et al. |
| 6,883,563 B2 | 4/2005 | Smith |
| 6,933,849 B2 | 8/2005 | Sawyer |
| 6,954,148 B2 | 10/2005 | Pulkkinen et al. |
| 6,970,574 B1 | 11/2005 | Johnson |
| 6,972,677 B2 | 12/2005 | Coulthard |
| 6,975,231 B2 | 12/2005 | Lane et al. |
| 6,992,561 B2 | 1/2006 | Sandt et al. |
| 7,015,816 B2 | 3/2006 | Wildman et al. |
| 7,019,644 B2 | 3/2006 | Barrie |
| 7,080,061 B2 | 7/2006 | Kabala |
| 7,099,895 B2 | 8/2006 | Dempsey |
| 7,150,284 B2 | 12/2006 | Aulbers et al. |
| 7,163,101 B2 | 1/2007 | Harper |
| 7,242,307 B1 | 7/2007 | LeBlond et al. |
| 7,271,728 B2 | 9/2007 | Taylor et al. |
| 7,285,114 B2 | 10/2007 | Harper |
| 7,286,057 B2 | 10/2007 | Bolling |
| 7,293,645 B2 | 11/2007 | Harper et al. |
| 7,311,523 B2 | 12/2007 | Collopy |
| 7,315,245 B2 | 1/2008 | Lynn et al. |
| 7,322,370 B2 | 1/2008 | Aulbers et al. |
| 7,372,367 B2 | 5/2008 | Lane et al. |
| 7,375,640 B1 | 5/2008 | Plost |
| 7,408,470 B2 | 8/2008 | Wildman et al. |
| 7,411,511 B2 | 8/2008 | Kennish et al. |
| 7,423,533 B1 | 9/2008 | LeBlond et al. |
| 7,425,900 B2 | 9/2008 | Lynn et al. |
| 7,443,302 B2 | 10/2008 | Reeder et al. |
| 7,443,304 B2 | 10/2008 | Rowe et al. |
| 7,443,305 B2 | 10/2008 | Verdiramo |
| 7,451,894 B2 | 11/2008 | Ophardt |
| 7,477,148 B2 | 1/2009 | Lynn et al. |
| 7,482,936 B2 | 1/2009 | Bolling |
| 7,495,569 B2 | 2/2009 | Pittz |
| 7,542,586 B2 | 6/2009 | Johnson |
| 7,551,089 B2 | 6/2009 | Sawyer |
| 7,551,092 B1 | 6/2009 | Henry |
| 7,597,122 B1 | 10/2009 | Smith |
| 7,605,704 B2 | 10/2009 | Munro et al. |
| 7,616,122 B2 | 11/2009 | Bolling |
| 7,659,824 B2 | 2/2010 | Prodanovich et al. |
| 7,676,380 B2 | 3/2010 | Graves et al. |
| 7,682,464 B2 | 3/2010 | Glenn et al. |
| 7,698,770 B2 | 4/2010 | Barnhill et al. |
| 7,755,494 B2 | 7/2010 | Melker et al. |
| 7,770,782 B2 | 8/2010 | Sahud |
| 7,804,409 B2 | 9/2010 | Munro et al. |
| 7,812,730 B2 | 10/2010 | Wildman et al. |
| 7,818,083 B2 | 10/2010 | Glenn et al. |
| 7,825,812 B2 | 11/2010 | Ogrin et al. |
| 7,855,651 B2 | 12/2010 | LeBlond et al. |
| 7,898,407 B2 | 3/2011 | Hufton et al. |
| 8,502,680 B2 | 8/2013 | Tokhtuev et al. |
| 2002/0082177 A1 | 6/2002 | Tabaac |
| 2002/0135486 A1 | 9/2002 | Brohagen et al. |
| 2002/0175182 A1 | 11/2002 | Matthews |
| 2003/0164456 A1 | 9/2003 | Petrich et al. |
| 2003/0197122 A1 | 10/2003 | Faiola et al. |
| 2004/0138535 A1 | 7/2004 | Ogilvie |
| 2004/0150527 A1 | 8/2004 | Harper et al. |
| 2005/0134465 A1 | 6/2005 | Rice et al. |
| 2005/0171634 A1 | 8/2005 | York et al. |
| 2006/0272361 A1 | 12/2006 | Snodgrass |
| 2006/0273915 A1 | 12/2006 | Snodgrass |
| 2006/0277065 A1 | 12/2006 | Guten et al. |
| 2006/0282459 A1 | 12/2006 | Kabala |
| 2007/0015552 A1 | 1/2007 | Bolling |
| 2007/0020212 A1 | 1/2007 | Bernal et al. |
| 2007/0096930 A1 | 5/2007 | Cardoso |
| 2007/0229288 A1 | 10/2007 | Ogrin et al. |
| 2007/0288263 A1 | 12/2007 | Rodgers |
| 2008/0001763 A1 | 1/2008 | Raja et al. |
| 2008/0019489 A1 | 1/2008 | Lynn |
| 2008/0019490 A1 | 1/2008 | Lynn |
| 2008/0021779 A1 | 1/2008 | Lynn et al. |
| 2008/0031838 A1 | 2/2008 | Bolling |
| 2008/0087309 A1 | 4/2008 | Aulbers et al. |
| 2008/0087719 A1 | 4/2008 | Sahud |
| 2008/0106374 A1 | 5/2008 | Sharbaugh |
| 2008/0131332 A1 | 6/2008 | Nguyen et al. |

(56) References Cited

U.S. PATENT DOCUMENTS

| | | |
|---|---|---|
| 2008/0136649 A1 | 6/2008 | Van De Hey |
| 2008/0185395 A1 | 8/2008 | Sahud |
| 2008/0246599 A1 | 10/2008 | Hufton et al. |
| 2008/0266113 A1 | 10/2008 | Kennish |
| 2008/0290112 A1 | 11/2008 | Lynn |
| 2009/0051545 A1 | 2/2009 | Koblasz |
| 2009/0068116 A1 | 3/2009 | Arndt |
| 2009/0084407 A1 | 4/2009 | Glenn et al. |
| 2009/0091458 A1 | 4/2009 | Deutsch |
| 2009/0112630 A1 | 4/2009 | Collins, Jr. |
| 2009/0119142 A1 | 5/2009 | Yenni et al. |
| 2009/0189759 A1 | 7/2009 | Wildman et al. |
| 2009/0195385 A1 | 8/2009 | Huang et al. |
| 2009/0204256 A1 | 8/2009 | Wegelin |
| 2009/0219131 A1 | 9/2009 | Barnett et al. |
| 2009/0224907 A1 | 9/2009 | Sinha et al. |
| 2009/0224924 A1 | 9/2009 | Sinha et al. |
| 2009/0237254 A1 | 9/2009 | Munro et al. |
| 2009/0237651 A1 | 9/2009 | Arndt et al. |
| 2009/0265990 A1 | 10/2009 | Stratmann |
| 2009/0267776 A1 | 10/2009 | Glenn et al. |
| 2009/0272405 A1 | 11/2009 | Barnhill et al. |
| 2009/0273477 A1 | 11/2009 | Barnhill |
| 2009/0276239 A1 | 11/2009 | Swart et al. |
| 2009/0295539 A1 | 12/2009 | Mahmoodi et al. |
| 2009/0295582 A1 | 12/2009 | Sawyer |
| 2009/0299787 A1 | 12/2009 | Barnhill |
| 2009/0301523 A1 | 12/2009 | Barnhill et al. |
| 2009/0324444 A1 | 12/2009 | Stratmann |
| 2010/0069087 A1 | 3/2010 | Chow et al. |
| 2010/0073162 A1 | 3/2010 | Johnson et al. |
| 2010/0094581 A1 | 4/2010 | Cagle |
| 2010/0097224 A1 | 4/2010 | Prodanovich et al. |
| 2010/0109877 A1 | 5/2010 | Bolling |
| 2010/0117823 A1 | 5/2010 | Wholtjen |
| 2010/0117836 A1 | 5/2010 | Momen et al. |
| 2010/0123560 A1 | 5/2010 | Nix et al. |
| 2010/0134296 A1 | 6/2010 | Hwang |
| 2010/0155416 A1 | 6/2010 | Johnson |
| 2010/0188228 A1 | 7/2010 | Hyland |
| 2010/0230435 A1 | 9/2010 | Wegelin |
| 2010/0238021 A1 | 9/2010 | Harris |
| 2010/0265059 A1 | 10/2010 | Melker et al. |
| 2010/0315244 A1 | 12/2010 | Tokhtuev |
| 2010/0321187 A1 | 12/2010 | Raccio |
| 2010/0328076 A1 | 12/2010 | Kyle et al. |
| 2010/0332022 A1 | 12/2010 | Wegelin et al. |
| 2011/0025509 A1 | 2/2011 | Brow |
| 2011/0273298 A1* | 11/2011 | Snodgrass et al. ......... 340/573.1 |
| 2011/0291840 A1 | 12/2011 | Pelland et al. |
| 2012/0112906 A1 | 5/2012 | Borke et al. |
| 2014/0135588 A1 | 5/2014 | Al-Ali et al. |

FOREIGN PATENT DOCUMENTS

| | | |
|---|---|---|
| EP | 1913892 A2 | 4/2008 |
| GB | 2298851 A1 | 9/1996 |
| GB | 2324397 A | 10/1998 |
| GB | 2425388 A | 10/2006 |
| JP | 62132161 A | 6/1987 |
| JP | 1219439 A | 9/1989 |
| JP | 9159768 A | 6/1997 |
| JP | 11332961 A | 12/1999 |
| JP | 2001292918 A | 1/2001 |
| WO | 00/68908 A1 | 11/2000 |
| WO | 02/077927 A1 | 10/2002 |
| WO | 2006135922 A2 | 12/2006 |
| WO | WO2008/119158 A1 | 10/2008 |
| WO | 2010/026581 A1 | 3/2010 |
| WO | WO2010/034125 A1 | 4/2010 |
| WO | 2010/099488 A1 | 9/2010 |
| WO | 2010/101929 A2 | 9/2010 |
| WO | 2010/141689 A2 | 9/2010 |

OTHER PUBLICATIONS

Denise M. Korniewicz, et al, "Exploring the Factors Associated with Hand Hygiene Compliance of Nurses During Routine Clinical Practice", Applied Nursing Research, 2010, pp. 86-90, vol. 23, Elsevier.
Andrew G. Sahud, et al, "An Electronic Hand Hygiene Surveillance Device: A Pilot Study Exploring Surrogate Markers for Hand Hygiene Compliance", Infection Control and Hospital Epidemiology, Jun. 2010, pp. 634-639, vol. 31, No. 6, The Society for Healthcare Epidemiology of America.
Philip M. Polgreen, et al, "Method for Automated Monitoring of Hand Hygiene Adherence Without Radio-Frequency Identification", Infection Control and Hospital Epidemiology, Dec. 2010, pp. 1294-1295, vol. 31, No. 12, The Society for Healthcare Epidemiology of America.
PCT/US2011/037667—International Search Report dated Jan. 5, 2012.
PCT/US2011/037667—PCT Written Opinion dated Jan. 5, 2012.
International Search Report and Written Opinion of the International Searching Authority for PCT/US2011/059747 mailed Jun. 1, 2012.
"Clean Hands—How it Works", http://www.cleanhands.biz/how.htm, printed Apr. 29, 2013, 2 pages, Clean Hands.
"VER-8610 Reports Plus", 2009, 2 pages, Versus Technologies, Inc.
VISion Enterprise Locating Solutions—"Hand Hygiene Compliance", 2009, 2 pages, Versus Technologies, Inc.
VISion Enterprise Locating Solutions—"Clinic Success Story", 2009, 1 page, Versus Technologies, Inc.
VISion Enterprise Locating Solutions—"Nurse Call", 2008, 1 page, Versus Technologies, Inc.
"VER-1780 Personnel Alert Badge (IR/RF)", 2008, 1 page, Versus Technologies, Inc.
"VER-1920 Flex Badge (IR/RF)", 2009, 1 page, Versus Technologies, Inc.
"VER-8235 History List View", 2008, 1 page, Versus Technologies, Inc.
"VER-8250 Rules Engine", 2008, 1 page, Versus Technologies, Inc.
"VISion Enterprise Locating Solutions", Brochure, 2008, 8 pages, Versus Technologies, Inc.
"AeroScout—AeroScout MobileView", 2011, 2 pages, 2011, Aeroscout, Inc.
"AeroScout—Hand Hygiene Compliance Monitoring—Application Note", 2 pages, 2011, AeroScout, Inc.
"Real-Time Location Systems (RTLS)", Feb. 2011, 2 pages, Centrak, Inc.
"A Secure Exit—Keep Wandering Patients Safe & Secure", 2010, 2 pages, Visonic Technologies, Ltd.
"Safety, Security & Visibility", Brochure, 2011, 4 pages, Visonic Technologies, Ltd.
"Amelior 360—Hand Hygiene—The Unique Real-Time Hand Hygiene Compliance Module", Brochure, 2011, 4 pages, Patient Care Technology Systems.
"Heathcare—Equipment Manufacturers", 2011, 1 pages, AiRISTA, LLC.
"Monitrac TS Temperature Monitoring", 2010, 2 pages, AiRISTA, LLC.
"Solutions for Healthcare", 2010, 2 pages, AiRISTA, LLC.
"Monitrac Senior Living Solution", 2010, 2 pages, AiRISTA, LLC.
"Hill-Rom's Handwashing Compliance Solution", Apr. 22, 2010, 2 pages, Hill-Rom Services, Inc.
"Proventix Partners with Synapse Wireless to Save Lives", http://www.prnewswire.com/news-releases/proventix-partners-with-synapse-wireless-to-sa . . . , printed Jul. 16, 2010, 4 pages, PR Newswire.
"Using Zigbee to Monitor Hand Hygiene Compliance", http://www.themobilehealthcrowd.com/?q=node/207, printed May 11, 2010, 2 pages, theMobileHealthCrowd.
"Whitepaper—Methodologies for Sharply Reducing Hospital-Acquired Infections", 7 pages, Dynamic Computer Corporation, Date Unknown.

(56) References Cited

OTHER PUBLICATIONS

Zieger, Anne; "Case Study: FL Hospital Uses IT to Monitor Hand Washing", http://www.fiercehealthit.com/node/8503/, Aug. 3, 2009, 1 page, Fierce Health It.

"Hand Washing Compliance Monitoring", http://www.centrak.com/solutions_hhc_monitoring.aspx, Printed Nov. 1, 2010, 1 page, Centrak Inc.

"CenTrak Acquires Important Patent for Dual Infrared/Radio Frequency (IR/RF Technology; IR/RF Approach Enables 100% Room-Level Location Accuracy: Patent # 5,917,425 'Infrared and RF Location System'," Press Release, http://www.centrak.com/PressRelease_08_06_2008.aspx, Jul. 8, 2008, Centrak Inc.

"Automated Hand Hygiene Compliance", http://www.pcts.com/unified/handhygiene.php, 2009, 2 pages, Patient Care Technology Systems.

"Hand Wash Monitoring System Provides Full Accountability", http://www.handgienecorp.com/pdf/handGiene_Healthcare.pdf, 4 pages, Date Unknown, HandGiene Corp.

"Henry Tenarvitz of Versus Technology Speaks About RTLS at 'Meaningful Use Beyond EMRs' Event", https://www.dynamicrfidsolutions.com/blog/?p=623, Oct. 15, 2009, 4 pages, Dynamic Computer Corporation.

"Net/Tech to Unveil Patented Hygiene Guard Hand-Washing Monitoring System at the National Restaurant Show", http://findarticles.com/p/articles/mi_m0EIN/is_1997_April 3/ai_19277592/, Apr. 3, 1997, 2 pages, Business Wire.

"Net/Tech International, Inc. to Participate in Discovery Expo '97 at New York Hilton Jul. 9", http://www.prnewswire.com/news-releases/nettech-international-inc-to-participate-in-disc . . . , Jul. 7, 1997, 1 pages, PR Newswire.

"Michigan IT Companies Helping the University of Miami Center for Patient Safety Tackle a Leading Cause of Death Using an RTLS Solution to Monitor Staff Hand-Washing Compliance", Jul. 29, 2009, 2 pages, Versus Accuracy Matters and Dynamic Computer Corporation.

Ali, Farida, "Will RFID Improve Hygiene in Hospitals?", Jun. 24, 2010, 3 pages, Dynamic Computer Corporation.

"How It Works", http://handgienecorp.com/howItWorks.php, printed Sep. 28, 2010, 1 page, HandGiene Corp.

"nGage", http://www.proventix.com/Products.aspx, printed Sep. 28, 2010, 2 pages, Proventix.

United States Patent and Trademark Office, Office Action for U.S. Appl. No. 13/291,679, Mar. 4, 2014, 18 pages, USA.

United States Patent and Trademark Office, Office Action for U.S. Appl. No. 13/291,679, Aug. 7, 2014, 17 pages, USA.

United States Patent and Trademark Office, Office Action for U.S. Appl. No. 13/291,679, Dec. 29, 2014, 23 pages, USA.

* cited by examiner

HAND HYGIENE COMPLIANCE SYSTEM

CROSS-REFERENCE TO RELATED APPLICATIONS

The present application claims the benefit of provisional application No. 61/347,715 filed May 24, 2010, the content of which is hereby incorporated by reference in its entirety.

BACKGROUND OF THE INVENTION

The subject matter disclosed herein relates generally to hand hygiene compliance (HHC), and particularly to tracking and encouraging worker compliance with hand hygiene protocols. In a hospital setting, hospital associated infections (HAIs) may cause undue illness to patients. One way of decreasing the number of HAIs is for hospital workers to wash their hands at key phases of patient care. In an effort to reduce the number of HAIs, hospitals have implemented hand hygiene protocols for hospital staff. For example, staff at a hospital may be instructed to wash their hands when they enter a patient room, before any patient contact, before an aseptic task, after body fluid exposure risk, after patient contact, after contact with patient surroundings, and upon exiting the patient room.

Hospitals have a variety of techniques for reminding workers to follow hand hygiene protocols and for tracking worker compliance with hand hygiene protocols. One method of reminding workers to follow hand hygiene protocols is to send a signal (e.g., an audio or visual reminder) to the health care worker (HCW) when the HCW enters or exits a patient's room. This method works well when hand hygiene requirements are the same for all patients and when the requirements are associated with a HCW being at a particular location. This method does not work well when hand hygiene requirements differ across patients, when the requirements differ based on a particular path taken by the HCW, and/or they differ based on an amount of time spent by the HCW at a particular location (e.g., next to the patient's bed). One method of tracking hand hygiene compliance (HHC) is to use "secret shoppers" to watch the staff to see if they are following the protocol. The secret shoppers may remind the HCWs and/or they may report on compliance. One drawback to the use of secret shoppers is that knowledge of the secret shoppers can cause an artificial spike in hand hygiene compliance, because the workers know that they are being watched.

Accordingly, and while existing HHC systems may be suitable for their intended purpose, there remains a need in the art for HHC systems that overcome these drawbacks.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention is a computer implemented method for performing hand hygiene compliance (HHC). The method includes receiving a notification that an individual has entered a physical location. The notification is received by a node in a wireless mesh network that includes a plurality of nodes corresponding to objects in the physical location. A hand hygiene protocol is identified for the individual. It is determined that the individual has not followed the hand hygiene protocol. The determining is performed by software executing on the nodes in the wireless mesh network and is responsive to a previous and a current location of the individual relative to the objects in the physical location. The individual is notified in response to determining that the individual has not followed the hand hygiene protocol.

An embodiment of the invention is a HHC system. The system includes a plurality of nodes corresponding to objects in a physical location, where the nodes form a wireless mesh network. The system also includes HHC software for execution on the nodes in the wireless mesh network to perform a method. The method includes receiving a notification that an individual has entered the physical location and identifying a hand hygiene protocol for the individual. The method also includes determining that the individual has not followed the hand hygiene protocol. The determining is responsive to a previous and a current location of the individual relative to the objects in the physical location. The method further includes notifying the individual in response to determining that the individual has not followed the hand hygiene protocol.

Another embodiment of the invention is a computer program product for performing HHC. The computer program product includes a tangible storage medium readable by a processing circuit and storing instructions for execution by the processing circuit for performing a method. The method includes receiving a notification that an individual has entered a physical location. The notification is received by a node in a wireless mesh network that includes a plurality of nodes corresponding to objects in the physical location. A hand hygiene protocol is identified for the individual. It is determined that the individual has not followed the hand hygiene protocol. The determining is performed by software executing on the nodes in the wireless mesh network and is responsive to a previous and a current location of the individual relative to the objects in the physical location. The individual is notified in response to determining that the individual has not followed the hand hygiene protocol.

A further embodiment of the invention is a computer implemented method for performing HHC. The method includes receiving a notification that an individual has entered a first physical location. The notification is received by a node in a wireless mesh network that includes a plurality of nodes corresponding to objects in the first physical location. A hand hygiene protocol is identified for the individual. It is determined that the individual has not followed the hand hygiene protocol. The determining is performed by software executing on a processor located in a second physical location, the determining responsive to a previous and a current location of the individual relative to the objects in the first physical location. The individual is notified in response to determining that the individual has not followed the hand hygiene protocol.

A further embodiment of the invention is a system for performing HHC. The system includes a plurality of nodes corresponding to objects in a first physical location. The plurality of nodes form a wireless mesh network. The system also includes HHC software for execution on a processor located in a second physical location for performing a method. The second physical location is different than the first physical location. The method includes receiving a notification that an individual has entered the first physical location and identifying a hand hygiene protocol for the individual. The method also includes determining that the individual has not followed the hand hygiene protocol. The determining is responsive to a previous and a current location of the individual relative to the objects in the first physical location. The method further includes notifying the individual in response to determining that the individual has not followed the hand hygiene protocol.

A further embodiment of the invention is a computer program product for performing HHC. The computer program product includes a tangible storage medium readable by a processing circuit and storing instructions for execution by the processing circuit for performing a method. The method includes receiving a notification that an individual has entered a first physical location. The notification is received by a node in a wireless mesh network that includes a plurality of nodes corresponding to objects in the first physical location. A hand hygiene protocol is identified for the individual. It is determined that the individual has not followed the hand hygiene protocol. The determining is performed by software executing on a processor located in a second physical location, the determining responsive to a previous and a current location of the individual relative to the objects in the first physical location. The individual is notified in response to determining that the individual has not followed the hand hygiene protocol.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
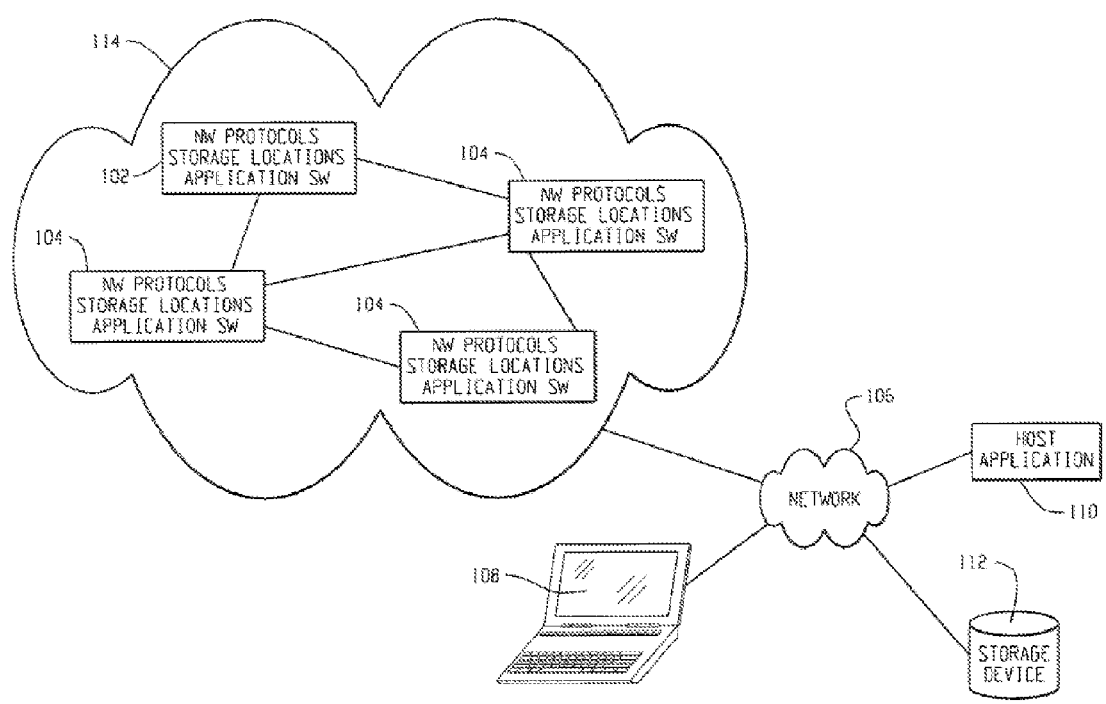
FIG. 1 depicts a hand hygiene compliance (HHC) system that may be implemented in accordance with an embodiment.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text provides a hand hygiene compliance (HHC) system. An embodiment of the system monitors healthcare worker (HCW) compliance with a hand hygiene protocol. If a HCW is not following the protocol, reminders are sent to the HCW. In addition, the non-compliance may be reported to a supervisor or other HHC personnel. An embodiment provides for two-way communication between an integrated circuit (IC) located on an employee badge and ICs corresponding to various objects (e.g., located on or integrated into) in a hospital. In an embodiment, the ICs on the badge and other objects are nodes in a wireless mesh network and include application software, mesh network protocols, and storage locations. The two-way communication between the nodes allows for more granular tracking of HCW actions that may require hand hygiene, for more reminders to the HCWs, and for more targeted reminders to the HCWs. In addition, the ability to store data at a node can provide for more customized hand hygiene instructions. For example, a node at a patient bed may store information about the status of the patient (e.g., staph infection). The node at the patient bed can communicate with a node in a sink and a node in a badge that the HCW is wearing to assure that the HCW has followed the procedure associated with the patient status (e.g., wash hands for three minutes and use soap with higher antibacterial content).

In an embodiment, a specific application is implemented on each node. This specific application, implemented by an application layer, is used to interface with the object and with nodes on other objects to assure that a specific process of HHC has been completed (e.g., that a hand hygiene protocol has been followed by a HCW). An example is that a node on a soap dispenser will relay location information but also can tell whether or not a HCW used soap from the soap dispenser. In addition, a sink node may relay location information and can also monitor the duration of hand scrubbing. In addition, the application layer may communicate to nodes on the soap dispenser and the sink to assure that both processes were performed by the same HCW, in order to assure that proper hand hygiene was performed. Examples of objects associated with nodes having application layers include, but are not limited to: beds, sanitizing gel dispensers, badges, room sensors, and any other object that is either involved in hand hygiene or contamination areas.

An example system implemented by an embodiment includes a badge node located on a HCW, an object node located at a door to a patient room, an object node located on a patient bed, and an object node located on a soap dispenser. One scenario for using the system includes the HCW entering the patient room. The object node located on the patient bed communicates the patient care requirements (e.g., hand hygiene requirements) to the other nodes in the network. If the HCW enters the room and walks towards the patient bed without exercising proper hand hygiene, the soap dispenser will communicate to the node on the badge and to the node on the bed that the soap dispenser has not been used. Then, the nodes (badge, soap dispenser, and bed) can use their relative proximity to determine that hand hygiene actions that should have been performed by the HCW have not been performed. In response to this determination, the HCW's badge flashes (or takes some action to get the HCW's attention and/or a supervisor's attention, such as vibrate for example) and/or the soap dispenser beeps (or takes some action to get the HCW's attention). Alternatively, if the HCW enters the room and performs hand hygiene, then the object node located on the soap dispenser may verify that the patient care requirements have been met (type of soap, length of washing, hand drying, etc.). All or a subset of the actions detected, as well as any other activities associated with the hand hygiene protocol, may be logged and reported.

FIG. 1 depicts a system implemented in accordance with an embodiment. The system depicted in FIG. 1 includes a wireless mesh network 114 made up of one or more badge nodes 102 and object nodes 104. As depicted in FIG. 1, the wireless mesh network 114 is in communication (e.g., via a transmission control protocol/Internet protocol or "TCP/IP" connection) with an existing network 106 for accessing a HHC host application located on a host system 110. In an embodiment, the existing network 106 e.g., an existing IT network) is implemented by a local area network (LAN). It will be appreciated that existing network 106 can be implemented using other types of networks such as, but not limited to the Internet, and an intranet. As depicted in FIG. 1, existing network 106 is in communication with the host system 110, a storage device 112, and a user device 108. The wireless mesh network 114 depicted in FIG. 1 covers one room. It will be appreciated that the system includes a plurality of wireless mesh networks 114. Each wireless mesh network 114 may span a variety of physical locations (also referred to herein as physical areas) such as, but not limited to, a single room, a group of rooms, a floor, a building, and two or more buildings. In an embodiment, the host system 110 is implemented by one or more processors, each of which may be located in the same physical location or a different physical location than the wireless mesh network.

Advantages to utilizing a wireless mesh network 114 includes the ability to provide seamless integration into existing buildings, independent operation from existing networks, self healing network if a node is damaged, sub-room level real-time asset tracking, ease of installation and maintenance, and ease of expandability.

Badge node 102 is located on a badge worn by a HCW. The badge node 102 includes network protocols, storage locations, and application software. The network protocols are used to transmit packets from the badge node 102 to the object nodes 104 (and to other badge nodes 102 if present in network 114) in wireless mesh network 114. The badge storage stores information associated with the HCW such as, but not limited to: name, occupation, specific hand hygiene procedures, location history including different contamination level zones, HHC history and accuracy, notification preferences. In an embodiment, the storage locations are implemented by a storage mechanism such as, but not limited to, random access memory (RAM) or nonvolatile memory (NVM).

In an embodiment, the application software located on the badge node 102 implements the functions described herein to perform HHC including: locating the HCW, determining a possible HHC protocol violation, reminding the HCW of the hand hygiene protocol, and reporting the possible violation. It will be appreciated that the badge node 102 may be located on the HCW by means other than a badge. For example, the badge node 102 may be located on a belt worn by the HCW or attached to a portable hand sanitizer carried by the HCW.

In an embodiment, locating the HCW is performed by a real time location system (RTLS) 103 using a methodology such as active radio frequency identification, infrared hybrid, optical locating, low-frequency signpost identification, semi-active radio frequency identification, ultrasound identification, ultrasonic ranging, ultrawide band, wide-over-narrow band, wireless local area network, and radio frequency transceivers. These methodologies may use a variety of algorithms to determine locations (e.g., of the HCWs) including, but not limited to: angle of arrival, line-of-sight, time of arrival, time difference of arrival, received channel power indicator, received signal strength indication, time of flight, symmetrical double sided-two way ranging, and near-field electromagnetic ranging. The RTLS 103 may be implemented via application software located on the badge node 102 and/or one or more object nodes 104.

In an embodiment, object nodes 104 are located on objects in a building. In the example depicted in FIG. 1, object nodes 104 are located on a patient bed, a soap dispenser, and at a sink. An object node 104 includes network protocols, storage locations, and application software. The network protocols are used to transmit and receive packets, and the application software implements functions described herein. The storage locations store information associated with the object such as, but not limited to: patient instructions, specific hand hygiene procedures, contamination zone level, HHC history and accuracy, notification preferences.

In an embodiment, an object node 104 is integrated into an object such as a soap dispenser or towel dispenser. In an embodiment, the object node 104 is built into the object during manufacturing and the HHC functionality described herein is enabled by providing a software key (or any other manner).

The user device 108 depicted in FIG. 1 is utilized to access the host application executing on host system 110. In an embodiment, the host application includes software instructions to set application parameters on the badge nodes 102 and object nodes 104, to generate reports on HHC, to provide software updates to the badge nodes 102 and object nodes 104, to store reports in the storage device 112, and to perform administrative functions (e.g., set up access security, and add users). In an embodiment, the host application includes software instructions to locate the HCW, to determine a possible HHC protocol violation, to remind the HCW of the hand hygiene protocol, and to report the possible violation.

In an embodiment, the user device 108 is used to monitor current HHC data related to a selected portion of a hospital (e.g., a room, a floor, a department). In an embodiment, access to monitor HHC data is restricted and only authorized users are given access to selected portions of the HHC data. For example, one user may be able to access HHC data for only one room, while another user may be given access to HHC data for a group of rooms or for an entire floor. In an embodiment, current HHC data is stored in storage device 112 and status is monitored via the user device 108. In another embodiment, all or a portion of the HHC data is not reported back to the host application.

In an embodiment, the host application is executed by an object node 104 located in wireless mesh network 114. The host application executing on an object node 104 may include a subset of the functionality provided when the host application executes on the host computer 110. In an embodiment, the subset includes monitoring and no reporting. In this manner, no reporting is sent back to a central location and the system is used to increase compliance, as opposed to also being used to report non-compliance.

Figure 2:
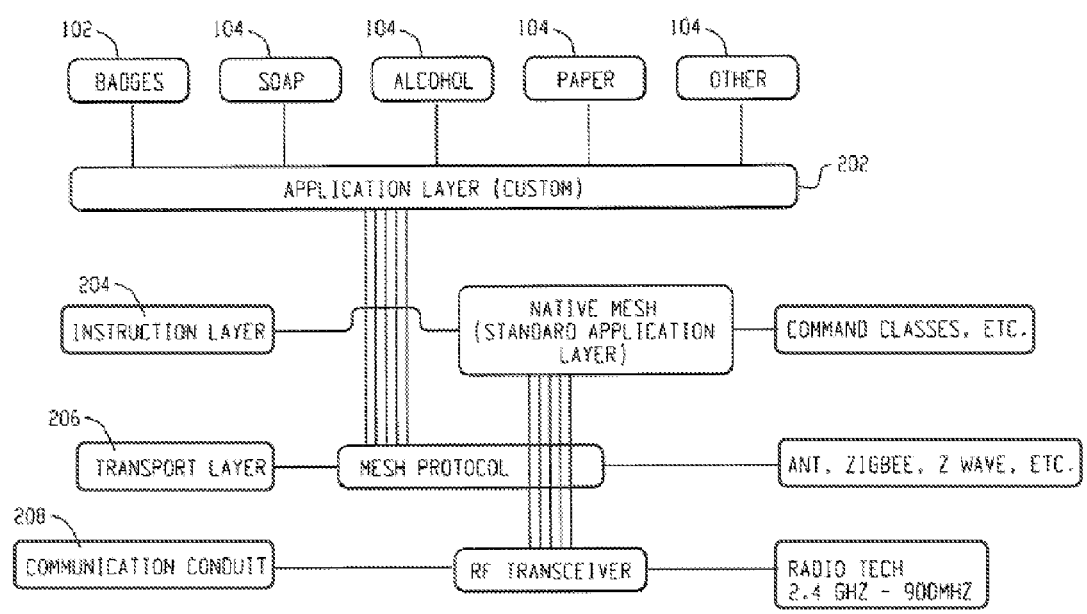
FIG. 2 depicts application, instruction, and transport layers that may be implemented in accordance with an embodiment.

FIG. 2 depicts application, instruction, and transport layers implemented in accordance with an embodiment. The application layer 202 depicted in FIG. 2 includes the application software and storage locations to carry out the node functions described herein. The application software is customized based on customer hand hygiene protocols. In an embodiment, all of the nodes (including the badge nodes 102 and the object nodes 104) contain the same software. In this embodiment, the object nodes 104 and badge nodes 102 may include customizations to differentiate them from each other, with the customizations stored in storage locations on the object nodes 104 and badge nodes 102. In another embodiment, the badge nodes 102 contain one set of software instructions and the object nodes 104 contain a different set of software instructions. In a further embodiment, two of more of the object nodes 104 contain a different set of software instructions tailored to the attached object.

Also depicted in FIG. 2, is an instruction layer 204, transport layer 206, and communication conduit 208 to carry out the networking functions described herein. In an embodiment, the instruction layer 204 and transport layer 206 are implemented using off the shelf software, and the communication conduit 208 is implemented using off the shelf hardware. In the embodiment depicted in FIG. 2, the instruction layer 204 is a native mesh implemented by using the standard command class structure of the selected protocol. These types of command classes may or may not have existing classes for HHC objects (i.e., a soap dispenser device command class). In many cases there will be no class structure for objects in the HHC system and a more generic command class will be used (e.g., for the soap dispenser, a single pull light switch device class, which will be on or off may be used). Another example is that a command class for a dimmer may be used to generate a percentage of run time on a pump in an alcohol dispenser to aid in determining how much of the alcohol was dispensed to a HCW.

In the embodiment depicted in FIG. 2, the transport layer 206 is a mesh protocol that interacts with the application layer 202 to communicate specific information pertaining to the HHC system. The application layer 202 handles the new HHC classes of devices and translates them into standard instruction layer device classes so that these new device classes can communicate directly with the mesh protocol in the transport layer 206. As shown in FIG. 2, the transport layer 206 is implemented by a wireless mesh network communication protocol, such as, but not limited to: ANT, ZigBee, and ZWave. In the embodiment depicted in FIG. 2, the transport layer 206 allows for new objects and commands to be entered into the network and decisions about them being handled by the device itself, or some variant of many other devices.

It will be appreciated that one reason that the ANT protocol may be preferable over the ZigBee protocol is because of battery life. A transport layer 206 implemented in the ANT protocol consumes much less battery power than a transport layer 206 implemented in ZigBee. Devices using the ZigBee protocol are usually utilized for line power, and therefore, built for use in the lighting industry. In the ZigBee protocol the battery powered nodes are in a separate network than the line powered nodes. This is done to save battery life, because a battery powered node does not have to awake all of the time to be ready to pass messages in a ZigBee implementation. In the HHC system, the badge node and object nodes need to be awake at all times and ready to pass messages.

In the embodiment depicted in FIG. 2, the communication conduit 208 is a radio frequency (RF) transceiver operating at between 900 megahertz (MHZ) and 2.4 gigahertz (GHZ) to provide a wireless connection for the nodes. However, other frequencies are contemplated. The instruction layer 204 communicates with the communication conduit 208 to provide wireless communication between the object nodes 104 and badge nodes 102.

A mesh network can be broken up into small subparts, referred to herein as "meshlets." When another node that can communicate with the nodes in a meshlet (e.g., it "speaks" the same language as the meshlet), comes into proximity of the meshlet, the other node and the nodes in the meshlet can all start communication. In an embodiment, the ability for the badge node 102 to communicate to object nodes 104 (and any other badge nodes 102) in the meshlet is used to determine if a HCW is in a room, how close the HCW is to a patient bed, and other data.

Figure 3:
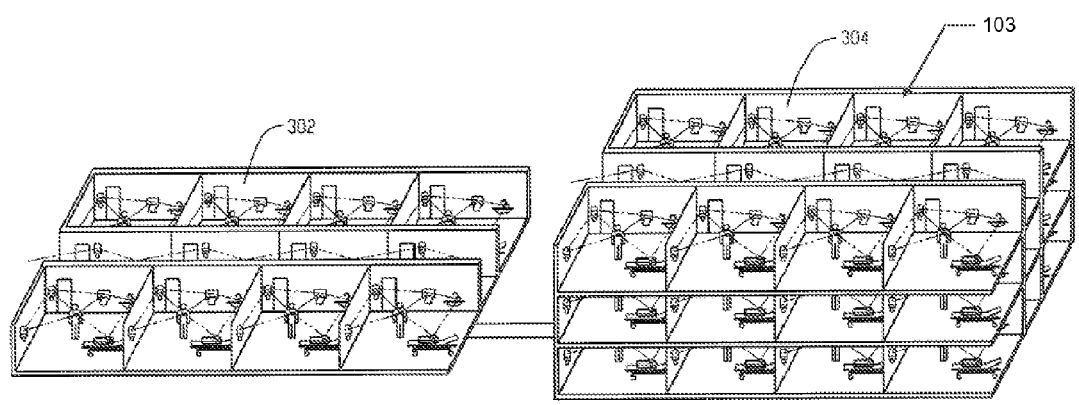
FIG. 3 depicts a HHC system that spans two physical locations that may be implemented in accordance with an embodiment.

FIG. 3 depicts an embodiment of a HHC system that spans two physical locations. As depicted in FIG. 3, a HHC system in a clinic 302 is in communication with an HHC system in a hospital via, for example, an existing TCIP infrastructure. The ability to link HHC systems together allows user devices with monitoring dashboards associated with the HHC systems to be located in any facility. Thus, the hospital 304 can monitor HHC at the clinic 302.

Figure 4:
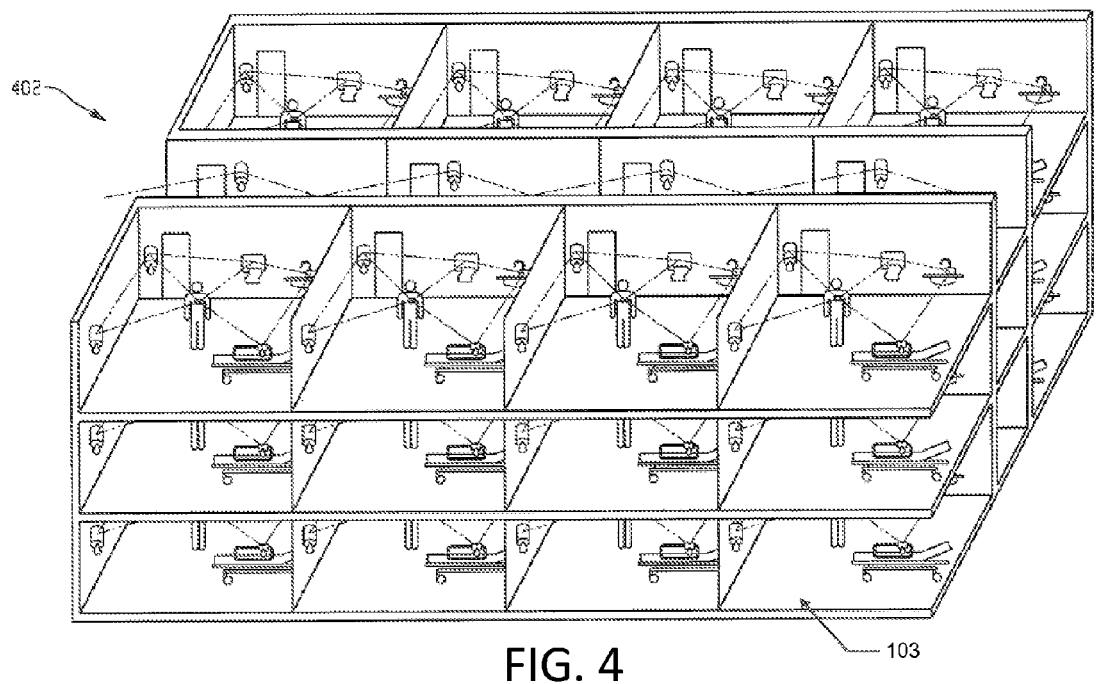
FIG. 4 depicts a mesh network spanning a hospital that may be implemented in accordance with an embodiment.

FIG. 4 depicts a parent mesh network spanning a hospital that is implemented in accordance with an embodiment. As depicted in FIG. 4, the physical location covered by the parent mesh network is the entire hospital 402. The parent mesh network depicted in FIG. 4 is made up of a plurality of meshlets.

Figure 5:
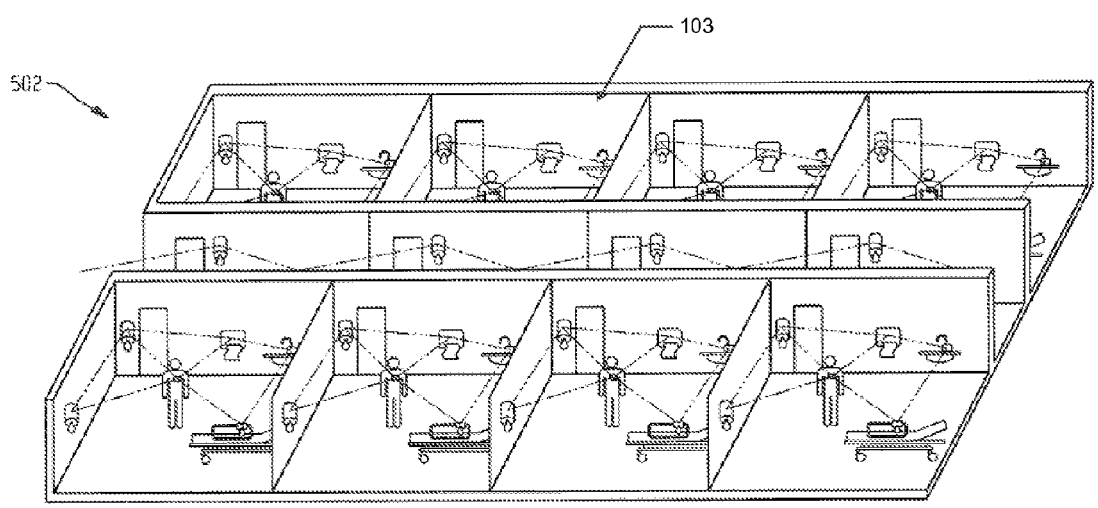
FIG. 5 depicts a mesh network spanning a section of a hospital that may be implemented in accordance with an embodiment.

FIG. 5 (with periodic reference back to elements shown in FIG. 4) depicts a parent meshlet that spans a section 502 of the hospital 402 that is implemented in accordance with an embodiment. As depicted in FIG. 5, the physical location covered by the parent meshlet is a section 502 of the hospital 402 such as a floor, a group, a wing, and/or a department. The parent meshlet depicted in FIG. 5 is made up of a plurality of micro meshlets and may also contain additional transceivers. In an embodiment, a meshlet (parent, micro, etc.) can be thought of as a team of nodes that are designed to perform a task, and that task is HHC for a room or a floor. The team of nodes in the meshlet communicate to each other at much higher frequencies than to a node at a different part of the hospital (even though communication is possible). The meshlet, which may contain other meshlets, works to ensure HHC for that room, or other defined space. In an embodiment, nodes located on a soap dispenser, a bed and a sink are in control of a room and don't require any outside information (e.g., information from nodes) to complete the task of ensuring HHC for the room. A plurality of these room meshlets may be combined to complete the task of ensuring HHC for a floor. In this case, all of the rooms on the floor work together to assure HHC on the floor so they have formed a meshlet.

Figure 6:
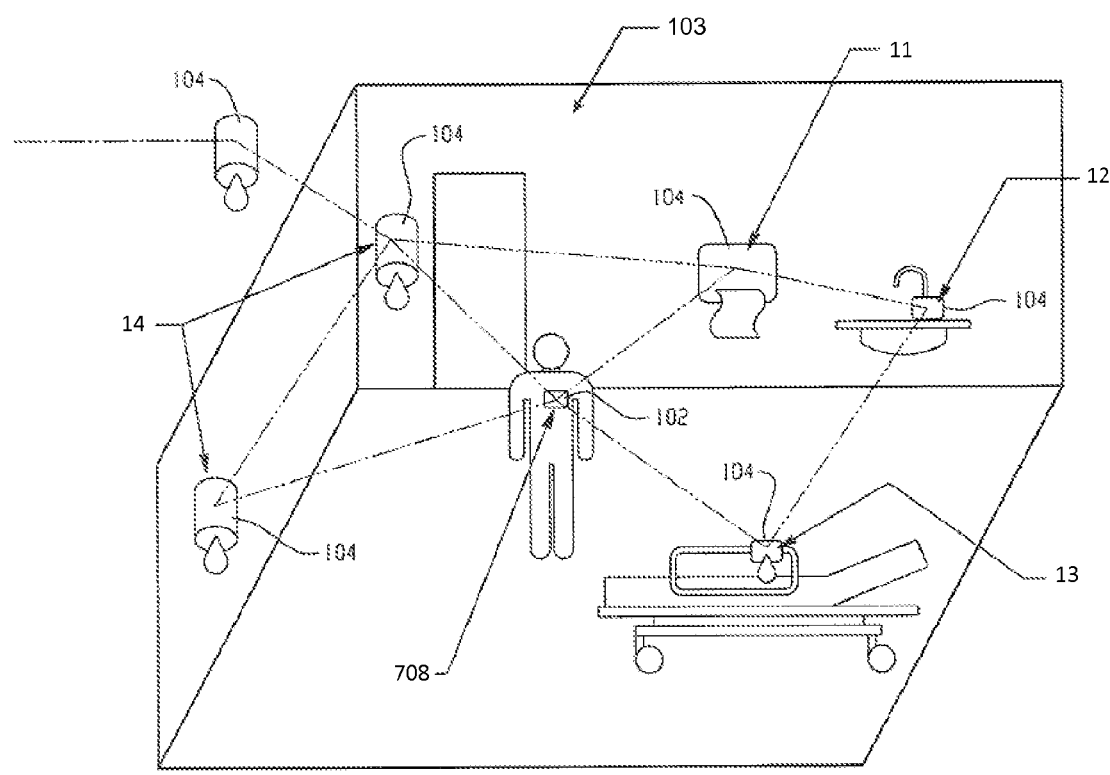
FIG. 6 depicts a subset of a mesh network spanning a room that may be implemented in accordance with an embodiment.

FIG. 6 depicts a micro meshlet that is contained in a hospital room in accordance with an embodiment. As depicted in FIG. 6, the physical location covered by the meshlet is the hospital room. The meshlet includes a badge node 102, a portable hand sanitizer 708, and a plurality of object nodes 104 located at a towel dispenser 11, a sink monitor 12, a bed monitor or dispenser 13, and several foam dispensers 14.

Figure 7A:
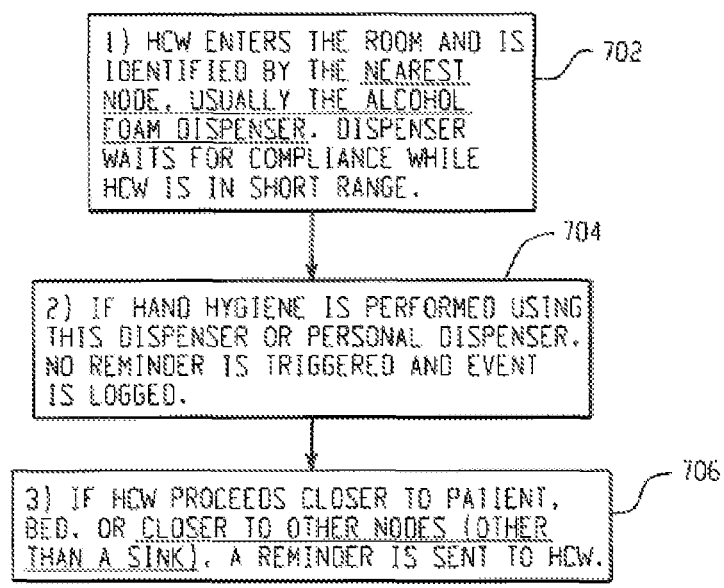
FIG. 7A depicts an example process flow that may be implemented when a HCW enters a patient's room and FIG. 7B depicts a portion of a mesh network that may participate in the process flow depicted in FIG. 7A, in accordance with an embodiment.
Figure 7B:
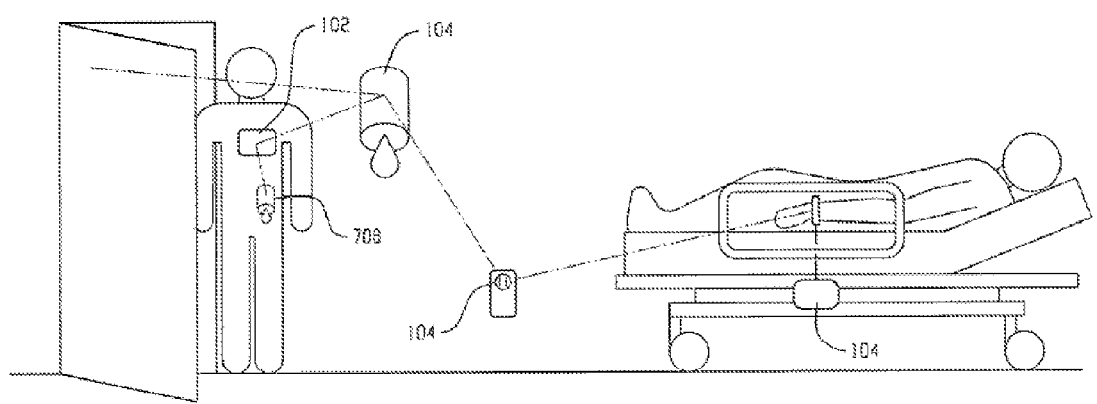

FIGS. 7A and 7B depict a process flow that is implemented by an embodiment of the HHC system when a HCW enters a patient's room in accordance with an embodiment. At block 702, the HCW enters the room and is identified by the nearest object node 104, which in this example, is located on an alcohol foam dispenser. The HCW is identified when a badge node 102 located on the HWC initiates a communication with the object nodes 104 in the room, the communication including information about the HCW such as employee identification. The object node 104 waits for compliance with a hand hygiene protocol that includes applying alcohol foam while the HCW is in short range. At block 704, if hand hygiene is performed using the alcohol foam dispenser, then no reminder is triggered and the event is logged. In an embodiment, the event is logged into a storage device that is accessible by monitoring and/or reporting functions. At block 706, if the HCW proceeds closer to the patient bed or closer to other nodes (other than a sink), then a reminder is sent to the HCW. The HCW in FIG. 7B is wearing a portable hand sanitizer 708.

Figure 8:
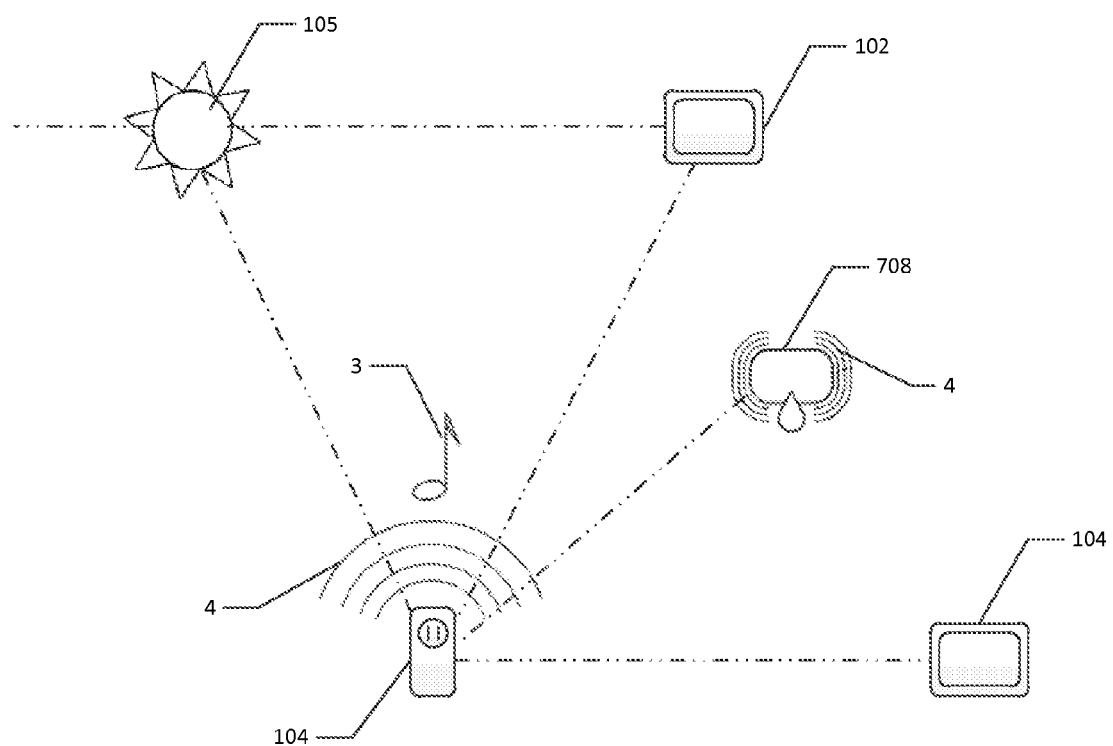
FIG. 8 depicts HCW reminders that may be generated in accordance with an embodiment.

FIG. 8 depicts HCW reminders that are generated by the HHC system in accordance with an embodiment. In an embodiment, the reminders include notifying the HCW using one or more of an audio 3, visual, and haptic alert 4. The reminder may be customized by individual HCW or based on patient needs. For example, if the HCW has a vibrating buzzer tag (an example of a haptic alert), the HCW can set this as their preference. Similarly, the HCW can set a preference for an audible beep or light emitting diode (LED) lights. Additionally, if the patient room needs to be quiet, or policy requires minimal noise, the volume can be set for each patient or globally. In one embodiment, object nodes 104 installed in outlets are used to perform tasks that require more power such as verbal audio reminders. In another embodiment, a wearable sanitizer dispenser with battery power for hands free operation utilizes the battery for vibration. In some embodiments, an object node 104 and/or a badge node 102 may communicate with a ceiling node 105. The ceiling node 105 may be in communication with other nodes of the wireless mesh network 114, network 106, user device 108, and/or the like, as indicated by the dot-dashed lines.

Figure 9:
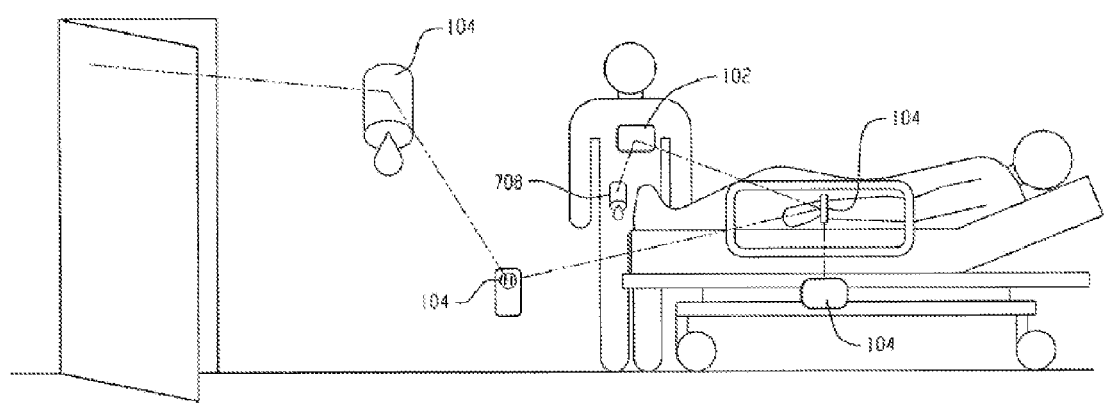
FIG. 9 depicts a process flow that may be implemented when a HCW interacts with a patient in accordance with an embodiment.

FIG. 9 depicts a process flow implemented by an embodiment of the HHC system when a HCW interacts with a patient in accordance with an embodiment. As depicted in FIG. 9, a patient identifier object node 104 located on a patient's wrist and/or a bed object node 104 located on the patient's bed is used to track patient interaction. This allows the HHC system to offer reminders based on time or patient treatment. For example, if the patient requires aseptic tasks or there is a greater chance of bodily fluid contact, more reminders can be triggered.

Figure 10:
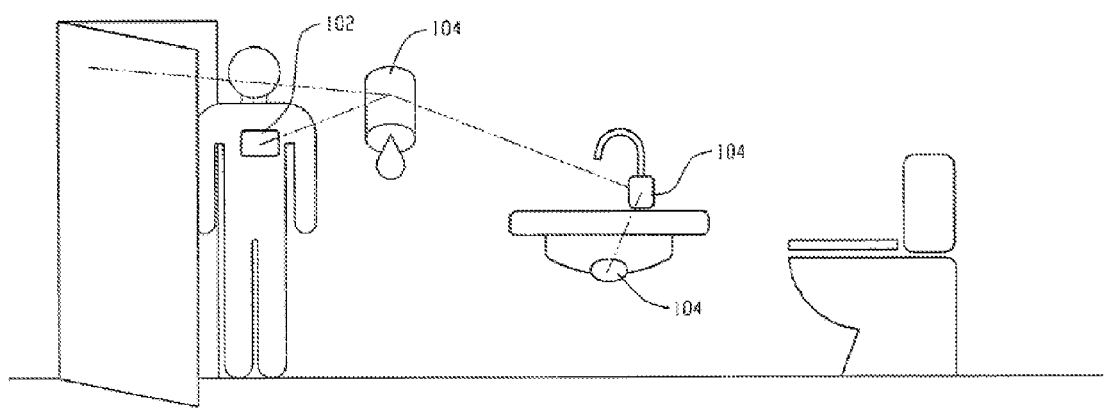
FIG. 10 depicts a process flow that may be implemented in a restroom in accordance with an embodiment.

FIG. 10 depicts a process flow that is implemented by the HHC system to provide HHC in another industry, such as the food service in accordance with an embodiment. As depicted in FIG. 10, after the worker passes an object node 104 located on the soap dispenser, or is in close proximity to the object node 104 located on the soap dispenser, the soap dispenser or the worker's badge generate a reminder to the worker. If the worker uses the dispenser, the reminder is quiet and the worker actions are recorded. If no soap dispensing occurs, then failure is reported. As depicted in FIG. 10, optional object nodes 104 are located on a faucet and sink bowl to track washing details such as duration and scrub style.

It will be appreciated that embodiments are not limited to health care environments, and that embodiments can be utilized in any environment (e.g., health care, food service, education, etc.) where individuals (e.g., workers such as HCWs, visitors, patrons, etc.) are required to follow a process.

Figure 11:
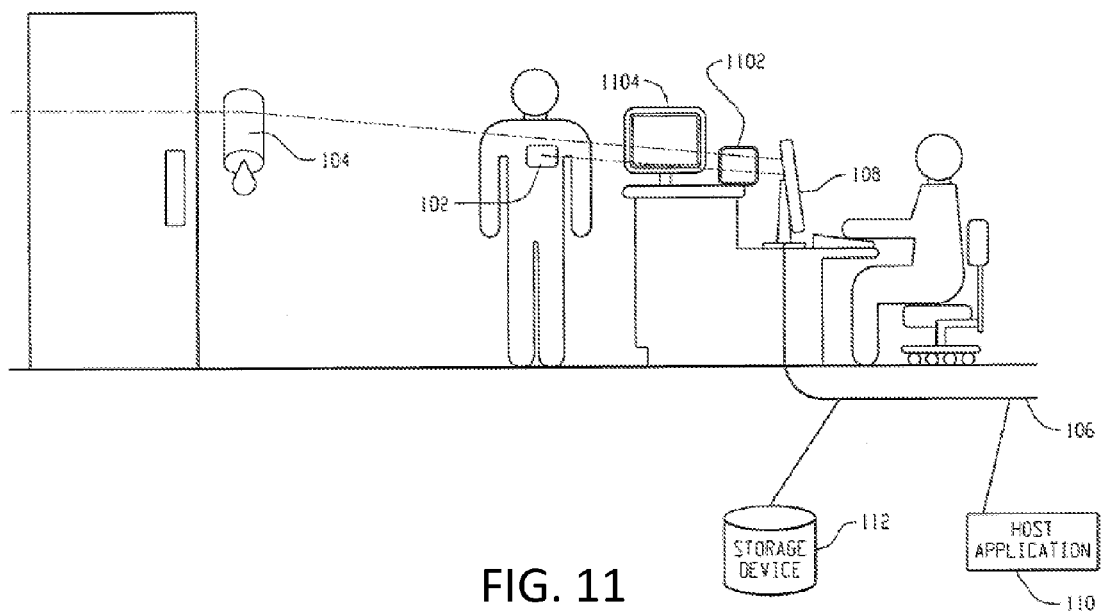
FIG. 11 depicts a process flow for monitoring HHC and changing HCW preferences in accordance with an embodiment.

FIG. 11 depicts a process flow for monitoring HCWs and for changing HCW preferences in accordance with an embodiment. A HCW, with the proper security access, can view group HHC or personal HHC performance data on a display 1104. In addition, HCWs can change their personal reminder preferences via the display 1104. As shown in FIG. 11, the display 1104 is a node in the wireless mesh network. Also as shown in FIG. 11, the display 1104 is connected to existing network 106 via a network bridge 1102 to transfer HHC compliance data to a centrally located storage device 112. As shown in FIG. 11, a manager may then access the host application on the host device 110, via the user device 108 to manage and observe results from the HHC system. Reports may be generated automatically or manually.

Figure 12:
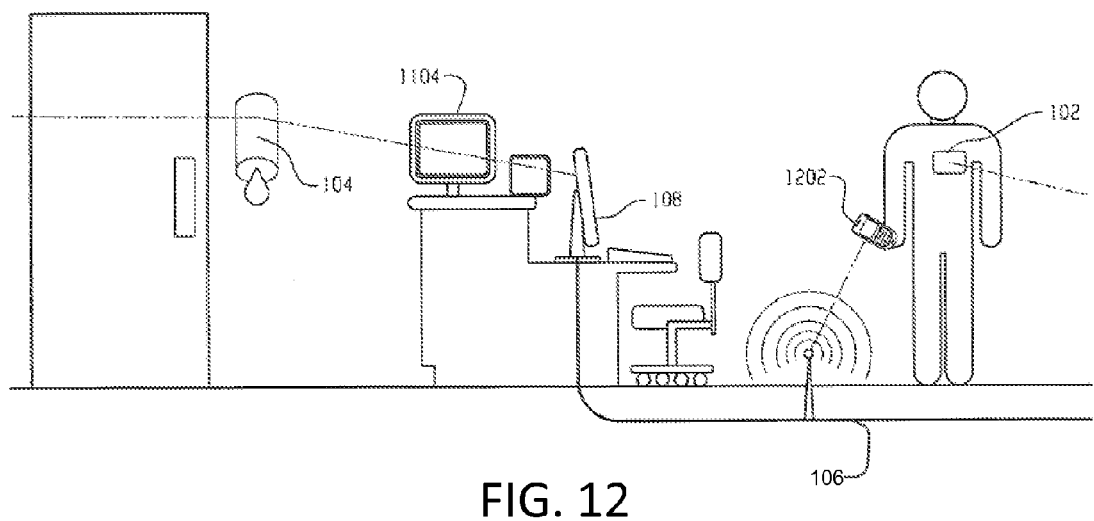
FIG. 12 depicts a system for providing mobile monitoring in accordance with an embodiment.

FIG. 12 depicts a system for providing mobile monitoring in accordance with an embodiment. In the embodiment depicted in FIG. 12, a manager is observing results from the HHC system via an application on a mobile telephone 1202 or other mobile device, possibly in communication with a server for mobile monitoring. For example, a manager may observe from a mobile phone app via wi-fi or 3G, etc.

Figure 13A:
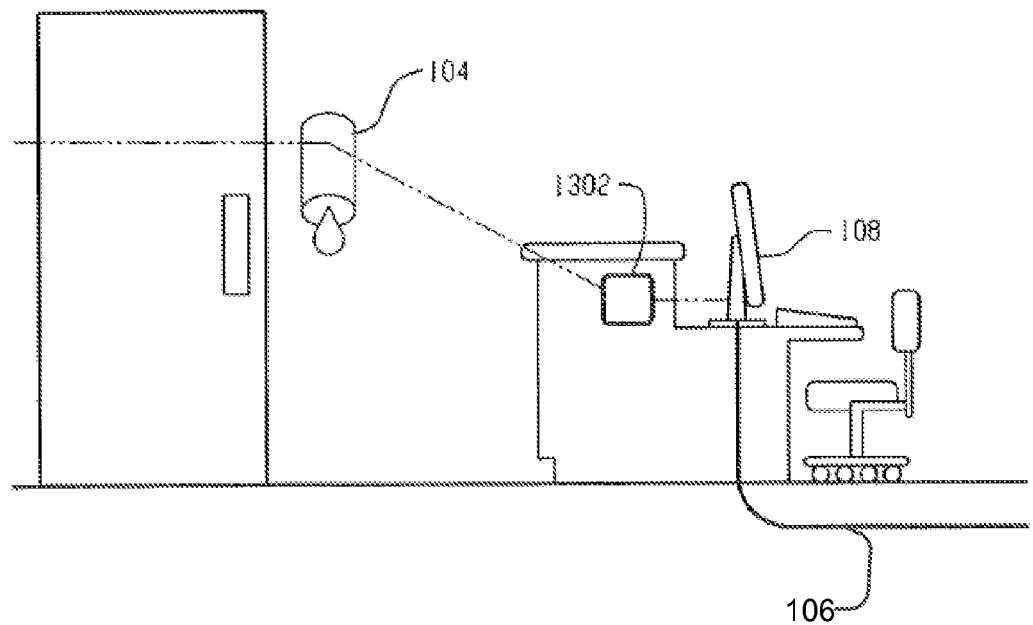
FIG. 13 depicts a system for bridging the HHC system to an existing network in accordance with an embodiment.
Figure 13B:
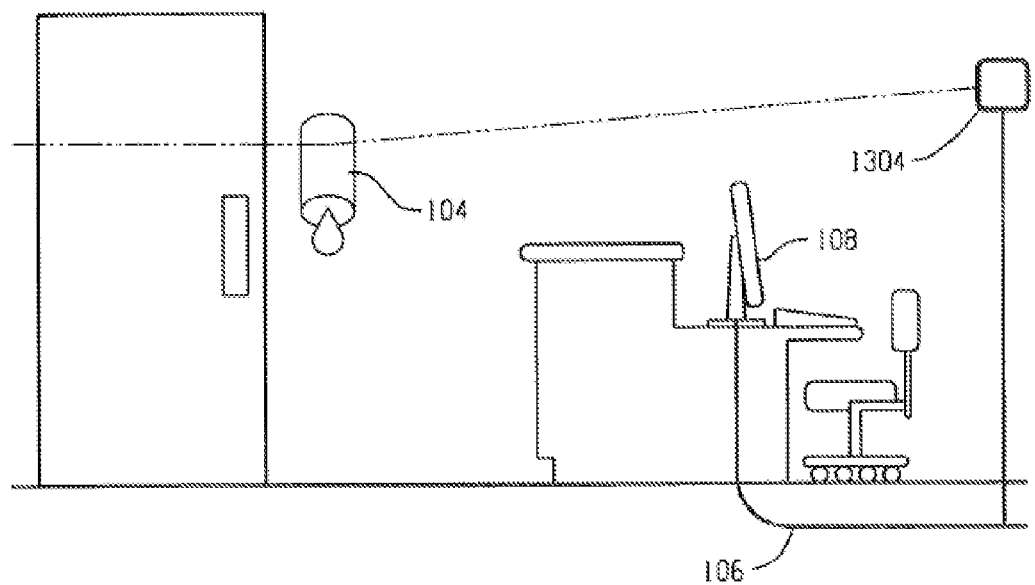

FIG. 13 depicts a system for bridging the HHC system to an existing network in accordance with an embodiment. The HHC system in the top portion of FIG. 13 is connected to existing network 106 via a USB device 1302. The HHC system in bottom portion of FIG. 13 is connected to existing network 106 via an ANT to WiFi or Ethernet device 1304.

Figure 14:
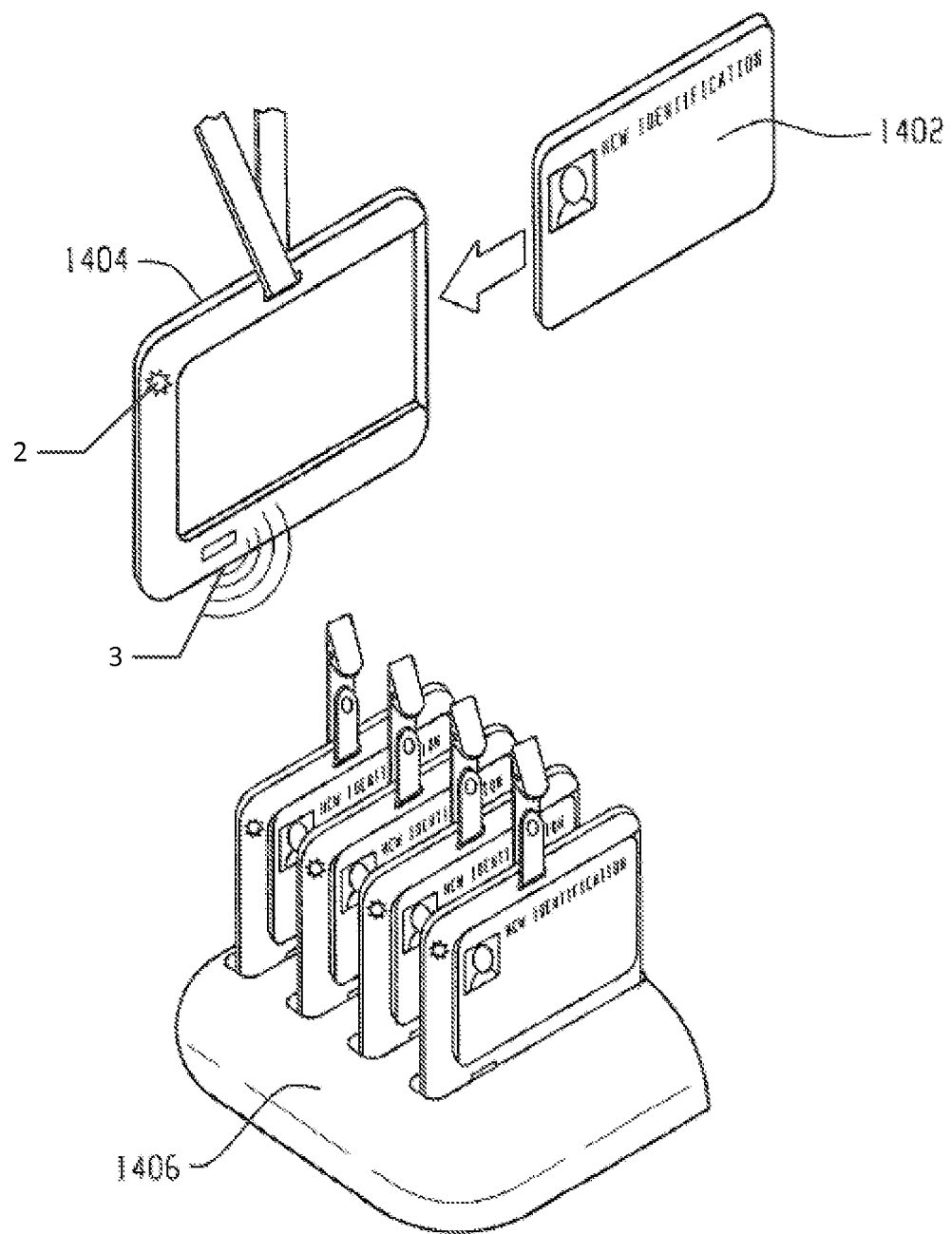
FIG. 14 depicts a badge that may be implemented in accordance with an embodiment.

FIG. 14 depicts a badge 1402 that may be implemented in accordance with an embodiment. In the embodiment depicted in FIG. 14, the badge 1402 is inserted into a badge shape 1404 that provides one or more of sight, sound and feel reminder options. FIG. 14 also depicts a charging station 1406 for charging the badge shape 1404.

Technical effects and benefits include the ability to more closely monitor the position of a HCW within a room and to send more customized reminders based on hand hygiene compliance opportunities that are detected by nodes in a wireless mesh network. In addition, zone based needs may be enforced for notifications (e.g., no audio alerts in a quiet zone). Another benefit is the ability to use the system for reminders only, thus providing an opportunity to increase compliance without the drawbacks of the "secret shopper" method described previously. A further benefit is the ability to integrate the HHC system with a RTLS 103 to locate HCWs and objects.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer implemented method for monitoring the performance of hand hygiene compliance, the method comprising:
   identifying, via a node in a wireless mesh network, that an individual has entered a physical location, the wireless mesh network comprising a plurality of nodes corresponding to objects in the physical location, each node comprising at least one network protocol, at least one storage location, and application software;
   identifying a hand hygiene protocol for the individual, wherein the identified hand hygiene protocol is based at least in part on one or more nodes in the wireless mesh network and in the vicinity of the individual;
   determining that the individual has not followed the hand hygiene protocol, the determining performed by software executing on one or more nodes in the wireless mesh network and in the vicinity of the individual and responsive to a previous and a current location of the individual relative to the objects in the physical location, based at least in part on communication between two or more nodes that are in the wireless mesh network and are in the vicinity of the individual; and
   notifying the individual in response to determining that the individual has not followed the hand hygiene protocol.

2. The method of claim 1, wherein identifying a hand hygiene protocol for the individual is based at least in part on the patient status information.

3. The method of claim 2, wherein the notifying includes one or more of an audio, visual, and haptic alert that is selected in response to the patient status information.

4. The method of claim 1, further comprising transmitting data to a central monitoring location in response to determining that the individual has not followed the hand hygiene protocol.

5. The method of claim 1, further comprising transmitting data to a central monitoring location in response to detecting activity associated with the hand hygiene protocol.

6. The method of claim 1, wherein the notifying includes one or more of an audio, visual, and haptic alert that is selected in response to characteristics of the physical location.

7. The method of claim 1, wherein the previous and the current location of the individual is determined using a real time location system (RTLS).

8. A hand hygiene compliance system comprising:
a plurality of nodes corresponding to objects in a physical location, the plurality of nodes forming a wireless mesh network, each node comprising at least one network protocol, at least one storage location, and application software; and
hand hygiene compliance software for execution on the nodes in the wireless mesh network;
the hand hygiene compliance software, when executed on the nodes of the wireless mesh network, is configured to cause the nodes to at least:
identify that an individual has entered the physical location;
identify a hand hygiene protocol for the individual, wherein the identified hand hygiene protocol is based at least in part on one or more nodes in the wireless mesh network and in the vicinity of the individual;
determine that the individual has not followed the hand hygiene protocol, the determining responsive to a previous and a current location of the individual relative to the objects in the physical location, based at least in part on communication between two or more nodes that are in the wireless mesh network and are in the vicinity of the individual; and
notify the individual in response to determining that the individual has not followed the hand hygiene protocol.

9. The system of claim 8, wherein identifying a hand hygiene protocol for the individual is based at least in part on the patient status information.

10. The system of claim 9, wherein the notifying includes one or more of an audio, visual, and haptic alert that is selected in response to the patient status information.

11. The system of claim 8, wherein the method further comprises transmitting data to a central monitoring location in response to determining that the individual has not followed the hand hygiene protocol.

12. The system of claim 8, wherein the method further comprises transmitting data to a central monitoring location in response to detecting activity associated with the hand hygiene protocol.

13. The system of claim 8, wherein the notifying includes one or more of an audio, visual, and haptic alert that is selected in response to characteristics of the physical location.

14. The system of claim 8, wherein the previous and current location of the individual is determined using a real time location system (RTLS).

15. A computer program product for monitoring the performance of hand hygiene compliance, the computer program product comprising:
a non-transitory storage medium readable by a processing circuit and storing instructions for execution by the processing circuit for performing a method comprising:
identifying, via a node in a wireless mesh network, that an individual has entered a physical location, the wireless mesh network comprising a plurality of nodes corresponding to objects in the physical location, each node comprising at least one network protocol, at least one storage location, and application software;
identifying a hand hygiene protocol for the individual, wherein the identified hand hygiene protocol is based at least in part on one or more nodes in the wireless mesh network and in the vicinity of the individual;
determining that the individual has not followed the hand hygiene protocol, the determining performed by software executing on one or more nodes in the wireless mesh network and in the vicinity of the individual and responsive to a previous and a current location of the individual relative to the objects in the physical location, based at least in part on communication between two or more nodes that are in the wireless mesh network and are in the vicinity of the individual; and
notifying the individual in response to determining that the individual has not followed the hand hygiene protocol.

16. The computer program product of claim 15, wherein identifying a hand hygiene protocol for the individual is based at least in part on the patient status information.

17. The computer program product of claim 16, wherein the notifying includes one or more of an audio, visual, and haptic alert that is selected in response to the patient status information.

18. The computer program product of claim 15, wherein the method further comprises transmitting data to a central monitoring location in response to determining that the individual has not followed the hand hygiene protocol.

19. The computer program product of claim 15, wherein the method further comprises transmitting data to a central monitoring location in response to detecting activity associated with the hand hygiene protocol.

20. The computer program product of claim 15, wherein the notifying includes one or more of an audio, visual, and haptic alert that is selected in response to characteristics of the physical location.

21. The computer program product of claim 15, wherein the previous and the current location of the individual is determined using a real time location system (RTLS).

* * * * *